July 6, 1937.   F. P. SMITH   2,086,194
METHOD AND MEANS FOR TREATING LEAF TOBACCO
Filed Oct. 11, 1932   10 Sheets-Sheet 1
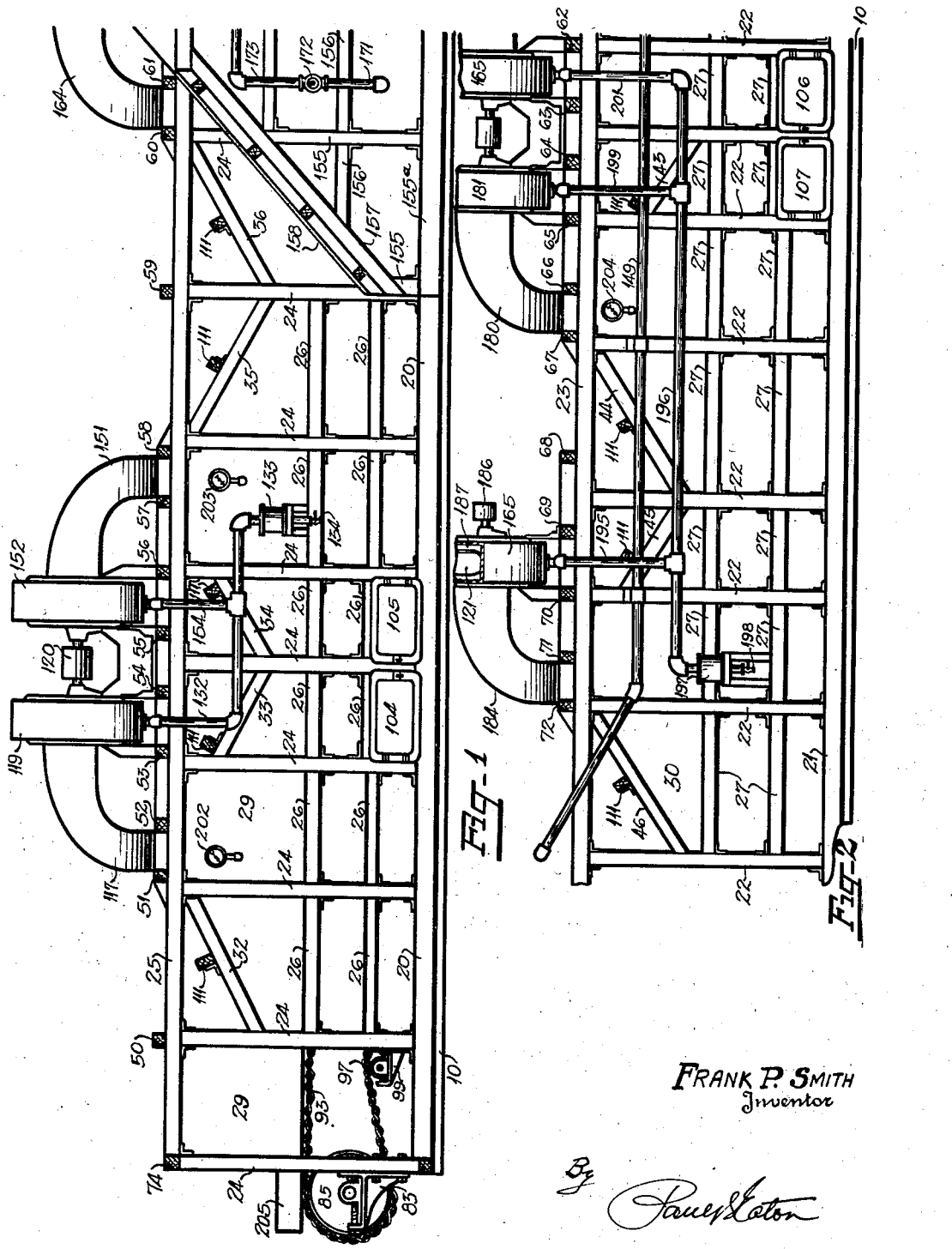
Frank P. Smith
Inventor July 6, 1937.　　　F. P. SMITH　　　2,086,194
METHOD AND MEANS FOR TREATING LEAF TOBACCO
Filed Oct. 11, 1932　　　10 Sheets-Sheet 2
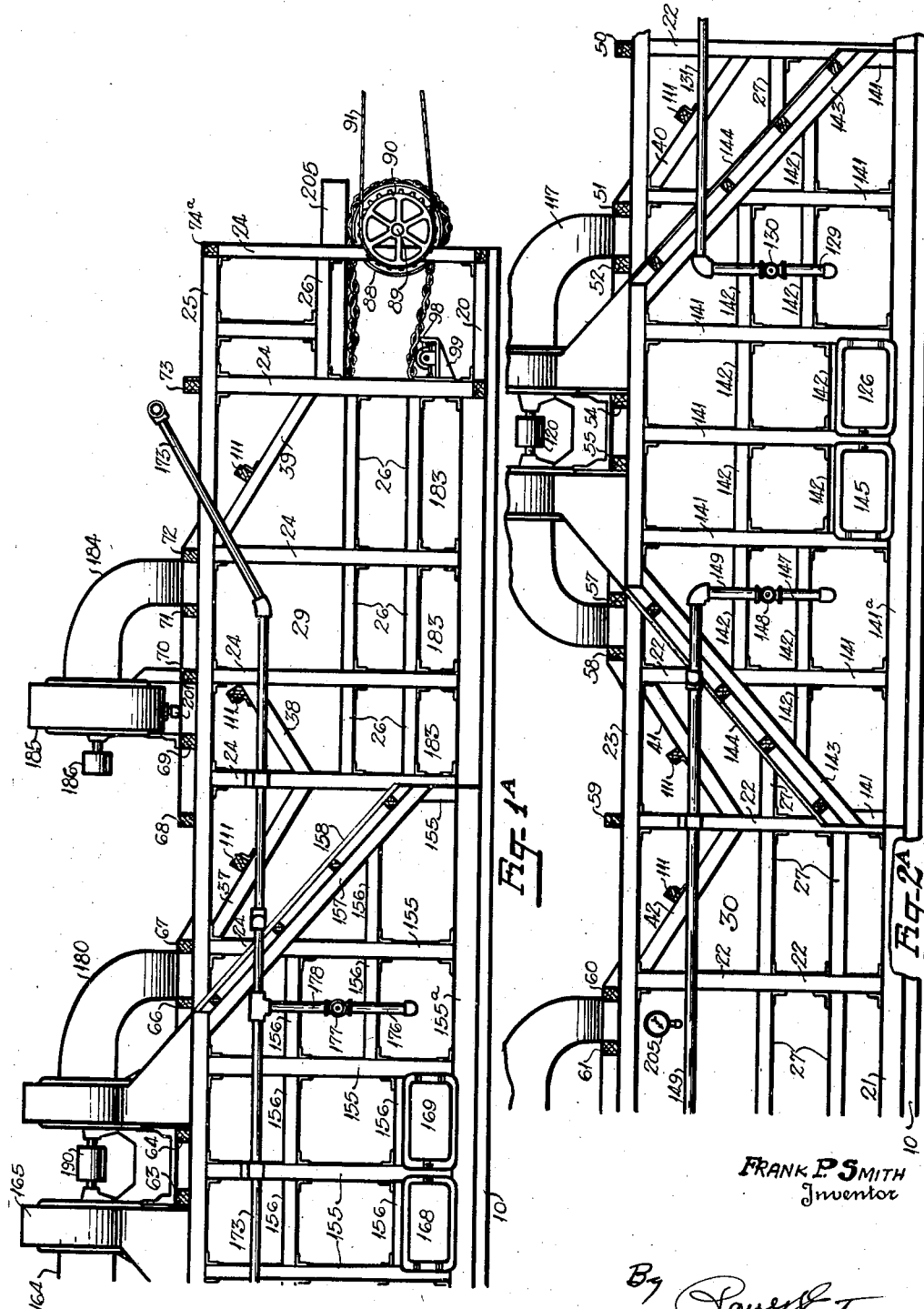
Frank P. Smith
Inventor
By Paul Eaton
Attorney

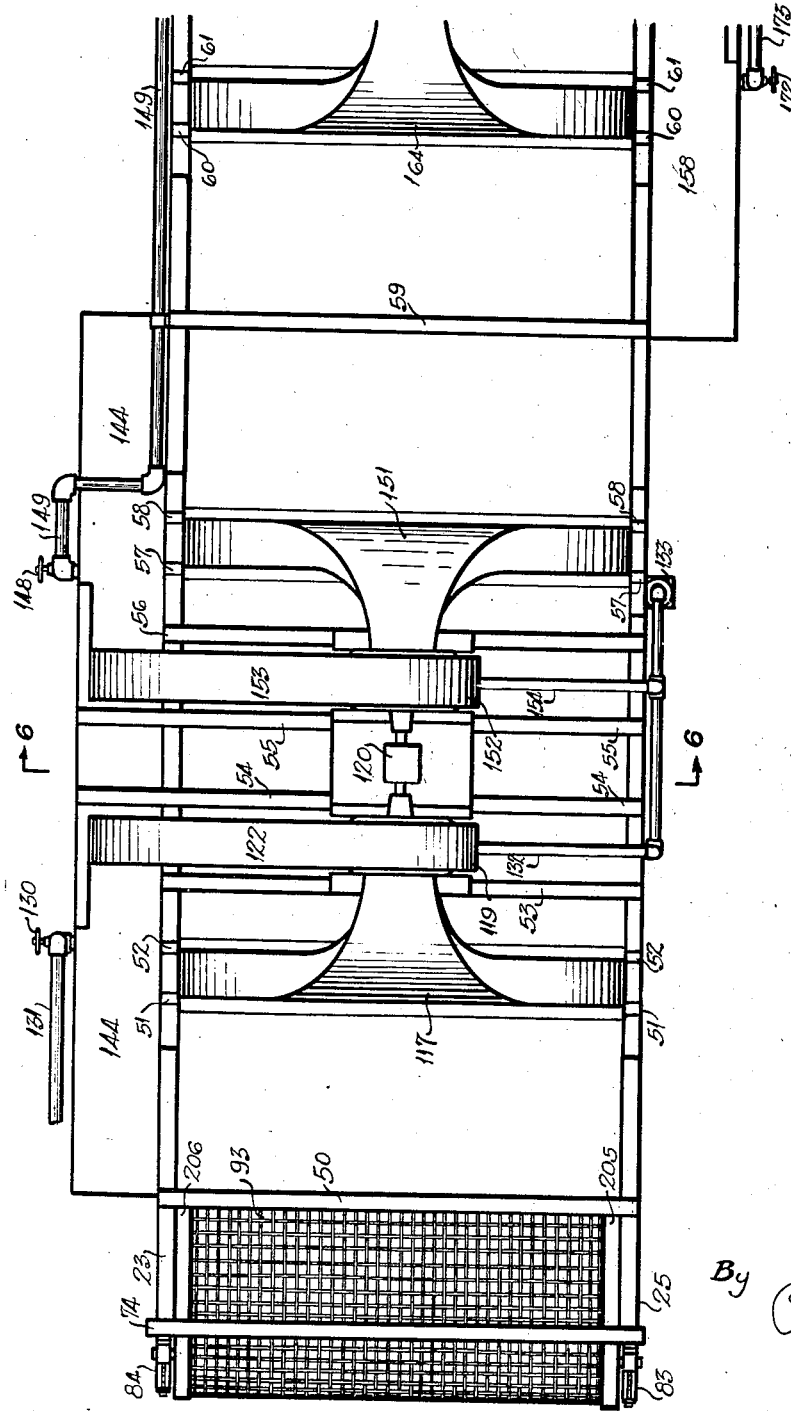

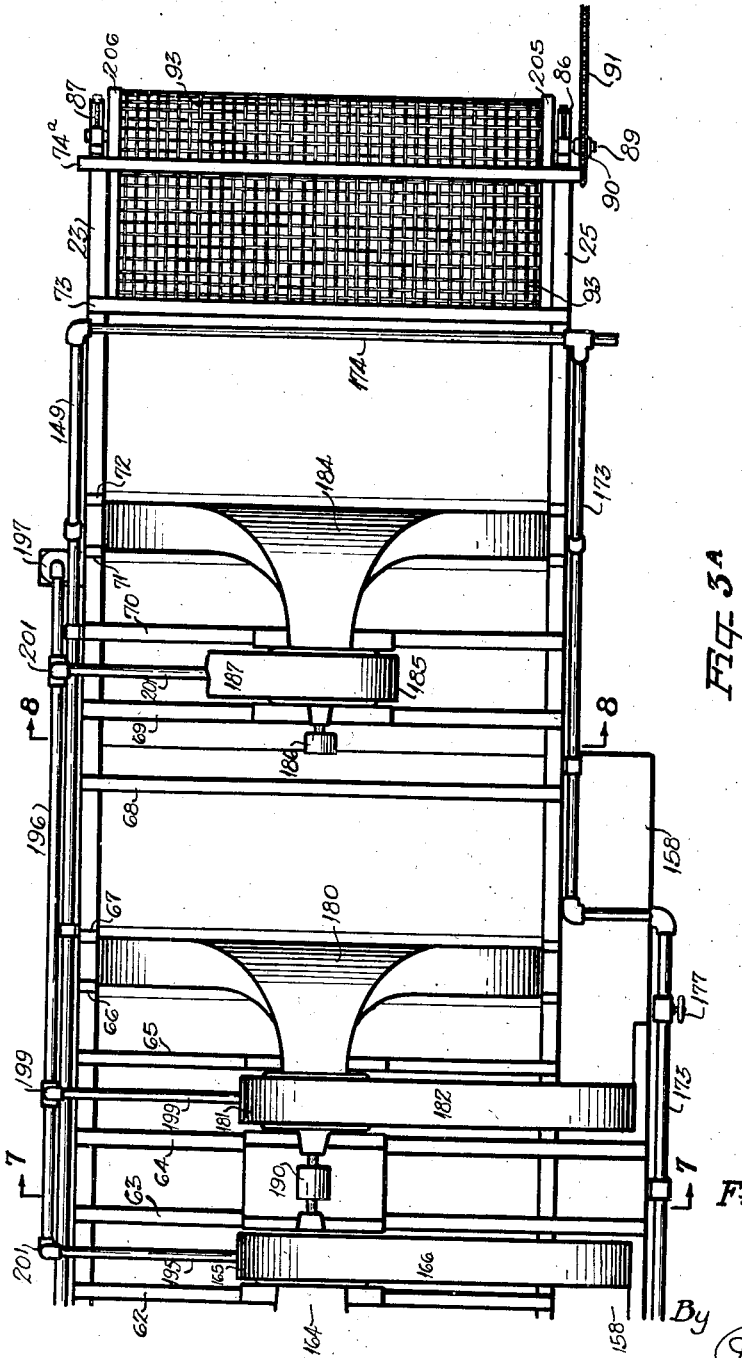

July 6, 1937.  F. P. SMITH  2,086,194
METHOD AND MEANS FOR TREATING LEAF TOBACCO
Filed Oct. 11, 1932  10 Sheets-Sheet 5
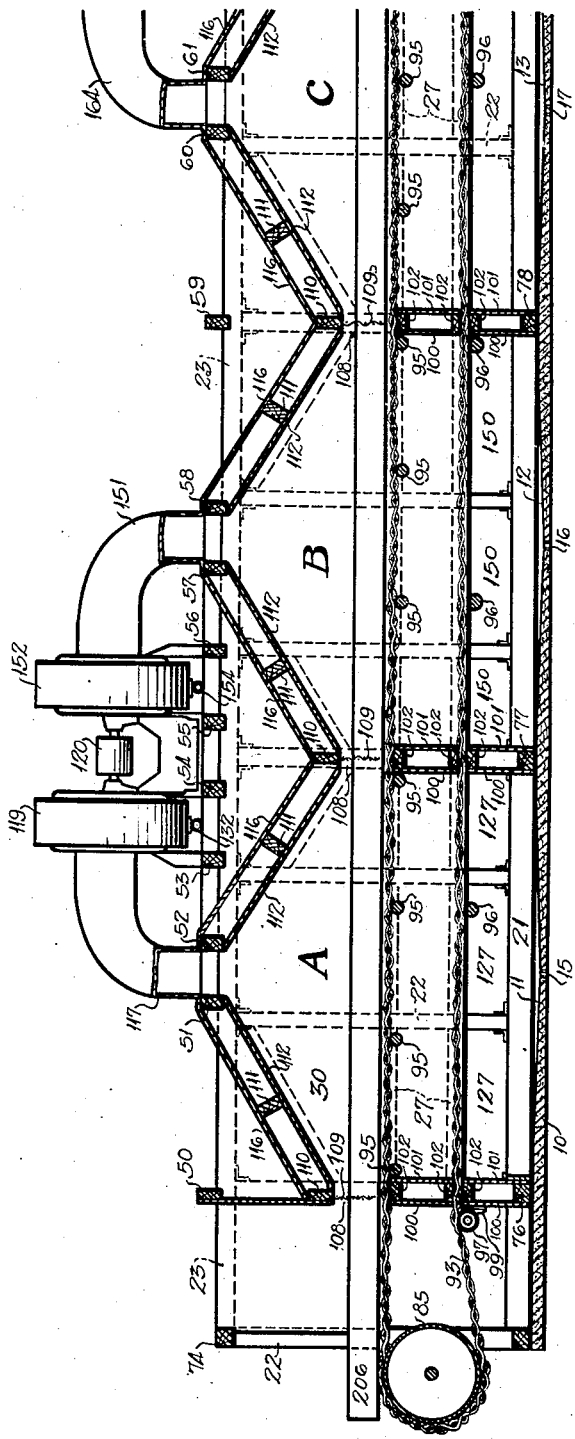

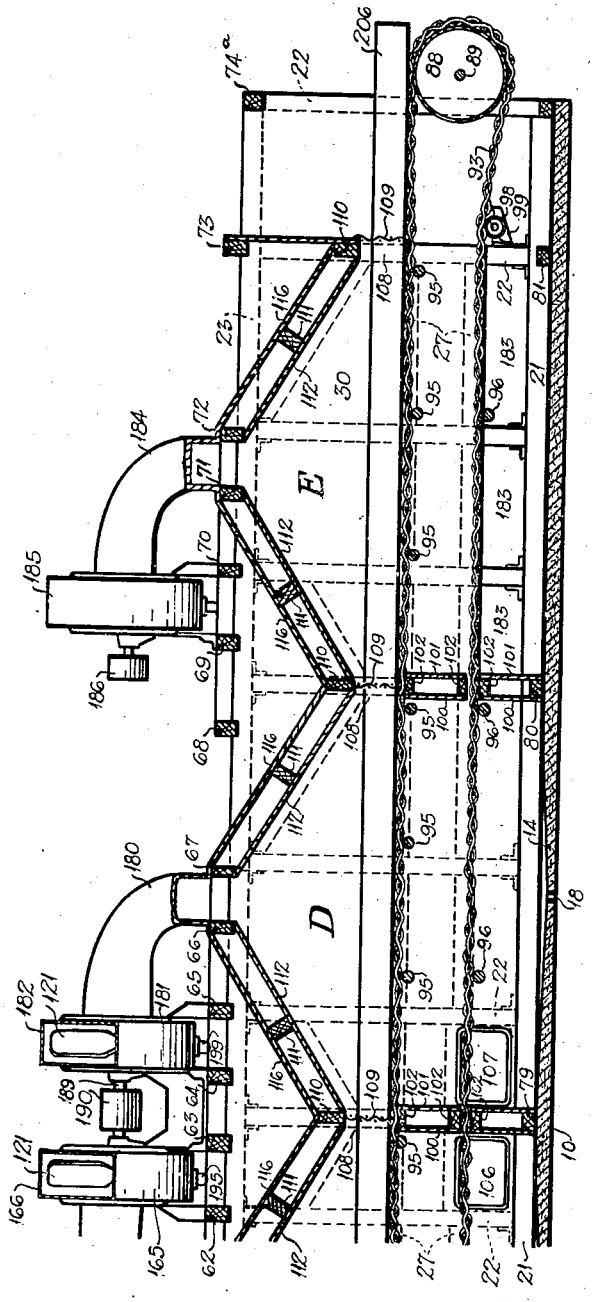

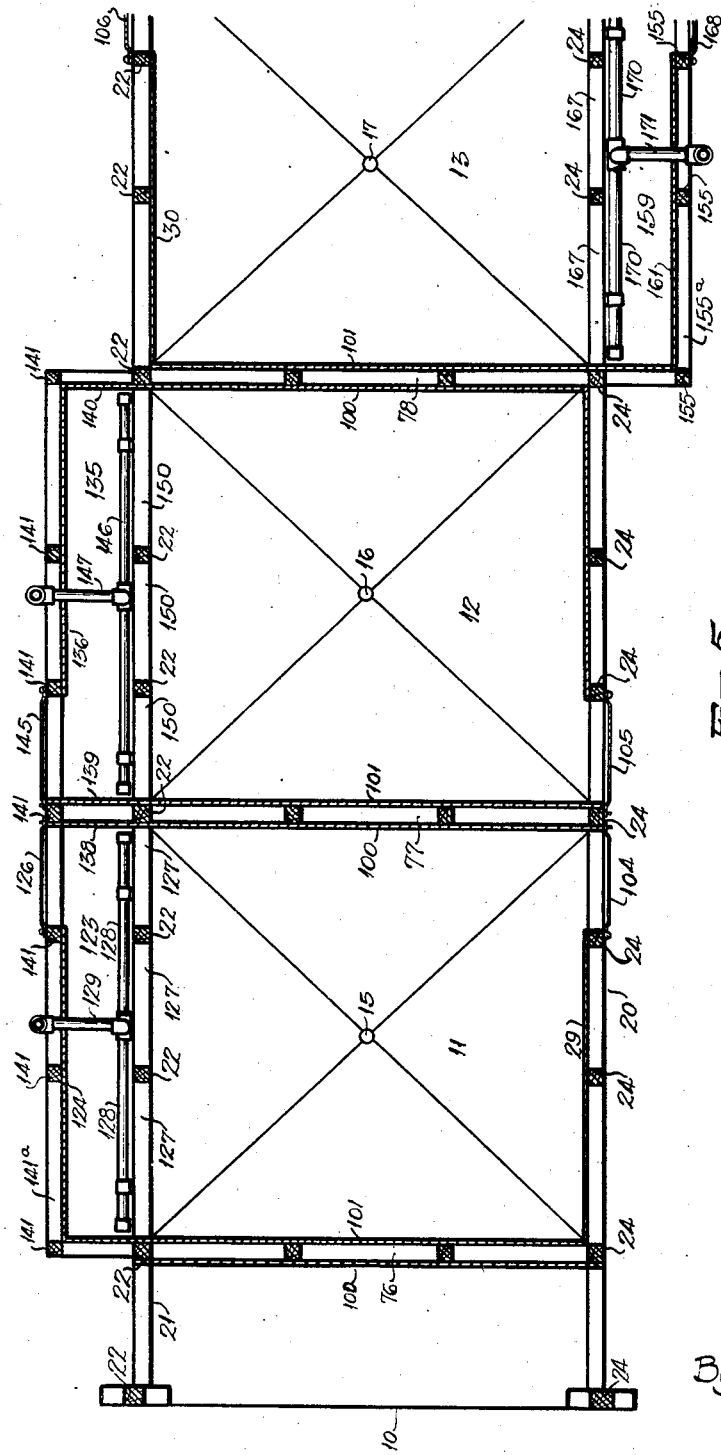

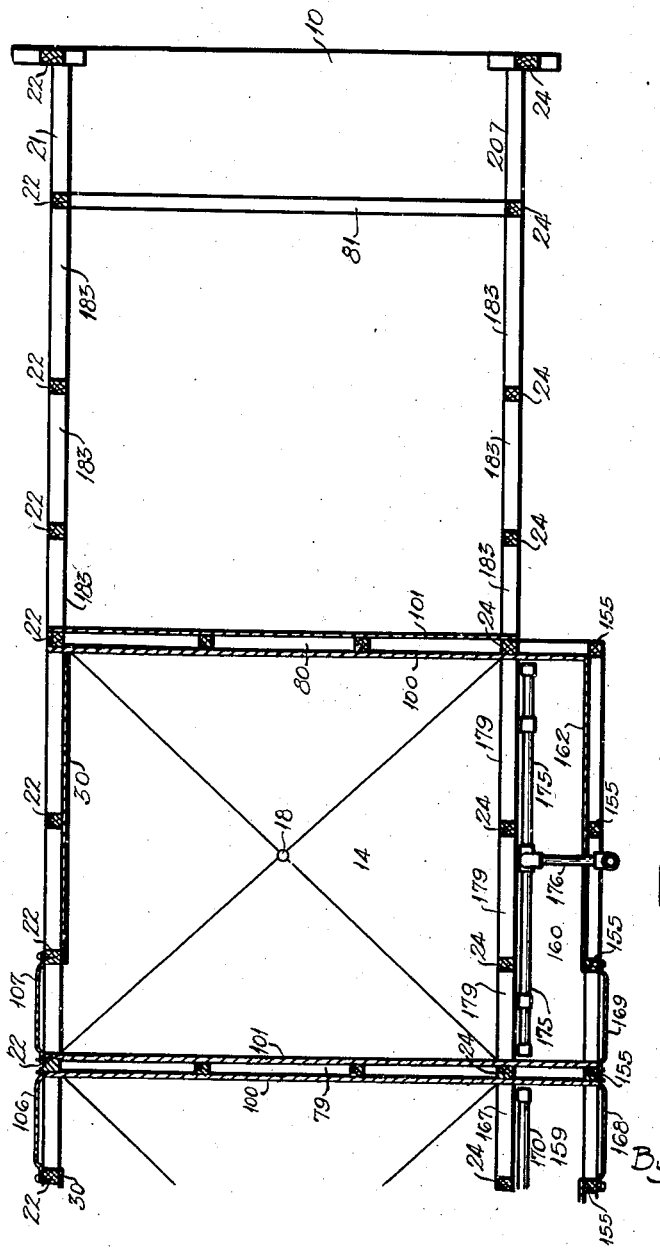

July 6, 1937. F. P. SMITH 2,086,194
METHOD AND MEANS FOR TREATING LEAF TOBACCO
Filed Oct. 11, 1932 10 Sheets-Sheet 9

FRANK P. SMITH
Inventor

By Paul H. Eaton
Attorney

July 6, 1937.  F. P. SMITH  2,086,194
METHOD AND MEANS FOR TREATING LEAF TOBACCO
Filed Oct. 11, 1932   10 Sheets-Sheet 10

FRANK P. SMITH
Inventor

Patented July 6, 1937

2,086,194

UNITED STATES PATENT OFFICE 2,086,194

METHOD AND MEANS FOR TREATING LEAF TOBACCO

Frank P. Smith, Winston-Salem, N. C., assignor to R. J. Reynolds Tobacco Company, Winston-Salem, N. C., a corporation of New Jersey Application October 11, 1932, Serial No. 637,287

24 Claims. (Cl. 131—55)

This invention relates to a method and means for ordering and purifying leaf tobacco. As is well known by those skilled in the art of handling leaf tobacco, a certain amount of humidity is necessary in the atmosphere to which the leaf tobacco is exposed in order for the leaves of tobacco to be handled without breaking to pieces, sometimes referred to as crumbling. In the preparation of leaf tobacco for the market, the handling of leaf tobacco is done only at times of the day, or on days in which there is a great deal of humidity in the air to cause the tobacco leaves to be pliable and capable of being handled without damage thereto.

It is an object of this invention to provide an improved machine for imparting to the tobacco the desired degree of moisture to cause the leaf tobacco to be easily handled without damage after it leaves the machine and passes onto other tobacco working machinery such as driers, crimp cut machines, granulating machines and the like.

It is an object of this invention to provide a machine thru which the leaves of tobacco are passed and in which machine the leaf tobacco is subjected to atmospheric conditions which not only cause the leaves of tobacco to come out at the discharge end of the machine in proper pliable condition and suitable for future handling, but which also purifies the tobacco by removing therefrom harmful ingredients.

The machine is so constructed as to prevent these removed impurities from condensing on parts of the machine and falling onto the tobacco when it travels therethrough.

The machine is so arranged and so provided with novel features as to cause the tobacco to be subjected to the proper amount of humidity and heat and to prevent the humidity from being condensed within the machine. This machine provides means whereby the humidity is condensed outside of the machine and the impurities thus condensed are removed from the machine and reclaimed for further use as disinfectants and the like.

By use of the improved machine hereinafter described and shown in the drawings, leaf tobacco can easily be ordered uniformly and quickly to the desired degree by this machine without any dripping of undesirable and harmful condensed vapors on the tobacco. The fact that no condensation of harmful vapors drips onto the tobacco treated in this new machine, gives the machine a great advantage over other machines of this character. The new machine is so constructed that these harmful vapors are withdrawn to the outside of the machine and there condensed.

The leaf tobacco is ordered and purified by fresh vapors that are made of proper conditions of temperature and humidity in special compartments in the machine. These vapors of proper conditions, not only quickly and uniformly bring the tobacco to the desired degree of flexibility, but remove harmful ingredients from the tobacco to condense the same outside of the machine. Due to the construction of the machine, the vapors have a circulation that is perfect for ordering and purifying the tobacco and for keeping the machine dry on the inside. This machine may be referred to as a vapor machine since the tobacco is ordered, purified, and delivered from the machine without any wet spots occurring thereon on account of the fact that the vapors are properly circulated within the machine and are not allowed to condense therein.

The machine having sloping insulated roofs, keeps the machine free from condensation. The mixing chamber for steam and air being disposed on the outside of the machine prevents any condensation from getting onto the tobacco. The machine, being insulated, uses less steam. The fans, not being insulated, condense the vapor after it is drawn thru the tobacco and thus take out the foreign matter to reclaim the foreign matter in liquid form outside of the machine for further use, for disinfecting purposes and the like, and the same air is used over and over by having moisture added thereto.

Heretofore, in machines of this type for treating tobacco the roof portions have not been insulated and have usually been flat, that is, disposed in a horizontal plane, which causes the mixture of steam and air to be condensed on the lower surface of the roof and this condensate, having therein harsh impurities, has heretofore fallen onto the tobacco to be carried along by the tobacco to be embodied in the manufacturing process. By providing the insulating sloping roof structure, condensation and consequent dripping onto the tobacco are eliminated. The sidewalls are shown as being made of wood, which also is an insulating medium to a certain extent. It is evident, however, that these sidewalls could be of other material, as any condensate which might form thereon would flow downwardly onto the asphalt base.

This machine, therefore, has a two-fold purpose, namely, the imparting to the tobacco of the desired degree of moisture to facilitate its subsequent handling and also the saturation of the tobacco with the mixture of steam and air to remove from the tobacco certain impurities and to reclaim these impurities on the exterior of the machine, thus preventing their mixture with the tobacco itself. It also provides a special compartment for heating the leaf tobacco to cause bunches thereof to open up to cause it to be more thoroughly treated in the subsequent compartments.

One peculiar feature of this machine is that although it appears that the upwardly moving draft would lift portions of the tobacco off the conveyor, such is not the case, because I have found by actual experiment that I recover only about one-tenth the amount of waste tobacco in the lower portion of the machine in comparison with former machines heretofore used for the ordering of tobacco.

Some of the objects of the invention having been stated, the invention will appear more fully when explained hereafter, when taken in connection with the accompanying drawings in which—

Figure 1 is a side elevation of one end of the machine;

Figure 1A is an elevation of the other end portion of the machine;

Figure 2 is a side elevation of the opposite side of Figure 1A with parts broken away;

Figure 2A is a side elevation of the opposite side as shown in Figure 1 with parts broken away;

Figure 3 is a top plan view of the portion of the machine shown in Figure 1;

Figure 3A is a top plan view of the portion of the machine shown in Figure 1A;

Figure 4 is a vertical longitudinal sectional view taken along the center of the machine but showing the fan housings and ducts leading thereto in elevation, with parts broken away;

Figure 4A is a vertical longitudinal sectional view taken along the center line with the fan housings and ducts leading thereto, partly in elevation, with parts broken away;

Figure 5 is a sectional plan view taken immediately below the conveyor belt in Figure 4;

Figure 5A is a sectional plan view taken immediately below the conveyor belt in Figure 4A;

Figure 6:
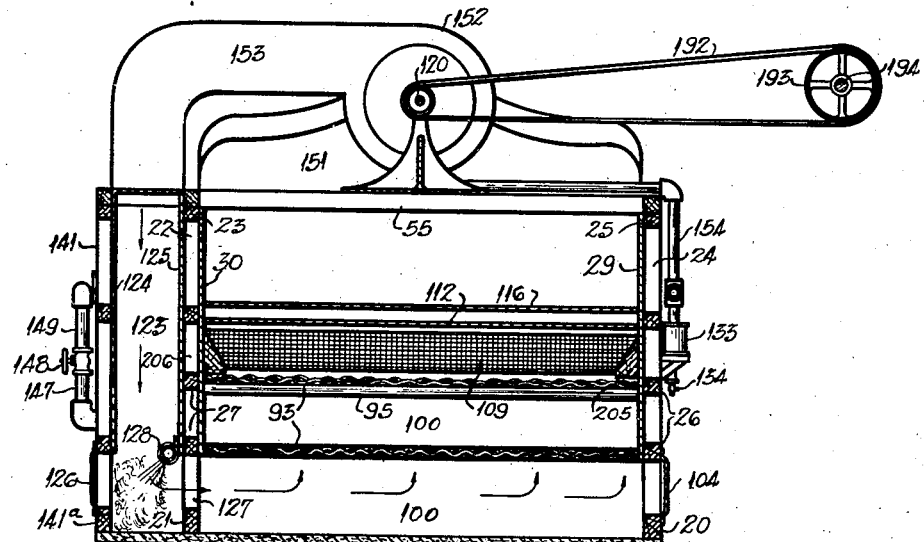
Figure 6 is a transverse vertical sectional view taken along line 6—6 in Figure 3.

Referring more specifically to the drawings, it will be noted that a suitable base 10 is provided which is preferably made of asphalt as it causes less condensation in the vapors within the machine and is heat-retaining, so the heat is retained in the base when the machine is stopped over night. Each of these bases has a plurality of sumps therein, there being a sump below each of the vapor compartments of the machine, and the sumps are indicated by reference characters 11, 12, 13, and 14. Each of these sumps has suitable drain holes 15, 16, 17, and 18. These holes 15 to 18 inclusive are connected to a suitable drainage system which is not shown. It will be noted in Figures 4A and 5A that the last compartment on the right, being a cooling compartment, does not have any sumps therein on account of the fact that such are not believed to be necessary.

Mounted on the asphalt base 10 is a plurality of longitudinally disposed strips 20, on one side thereof and such strips are indicated by reference character 21 on the other side of the machine, said strips being preferably of wood and lying flat on the asphalt base 10. A plurality of vertically disposed wooden members 22 occur on one side of the machine which members 22, on their lower ends, rest on members 21 and support on their upper ends the longitudinally disposed framework members 23.

The vertically disposed members 24 on the other side of the machine are supported at their lower ends by members 20 and at their upper ends support the longitudinally disposed strips 25. Disposed between the vertically disposed members 24 are a plurality of cross members 26 and disposed between vertically disposed members 22 are a plurality of cross members 27. These members serve to form the framework of the sidewalls of the machine. To the members 20, 24, 25, and 26 are secured the sidewalls of the machine which are shown in the form of boards 29. It is evident that these boards could be of ordinary plank and the like, but they are shown as being large boards secured to the members 20, 24, 25, and 26, forming a sidewall of the machine which is more efficient than a metallic sidewall, on account of preventing condensation of the vapors within the machine. Boards 30 are secured to the framework members 21, 22, 23, and 27 to form a sidewall for the other side of the machine. Angularly disposed cross strips 32, 33, 34, 35, 36, 37, 38, and 39 are provided on one side of the machine between the vertically disposed members 24, for supporting one side of the sloping roof structure for the compartments as will be presently described.

On the other side of the machine these angularly disposed members for supporting the other end of the sloping roof structure of the machine are indicated by reference characters 40, 41, 42, 43, 44, 45, and 46, it being evident that some of these angularly disposed members are located behind the steam chambers in the elevations and therefore are not shown. Enough of such members are shown to indicate that the sloping roof structures are supported therein by suitable arrangement of the angularly disposed members in the sidewalls of the machine.

The two sidewalls are secured together at the upper edges thereof by having a plurality of cross members 50, 51, 52, 53, 54, 55, 56, 57, 58, 59, 60, 61, 62, 63, 64, 65, 66, 67, 68, 69, 70, 71, 72, and 73 resting on top thereof with end members 74 and 74a secured between the top members 23 and 25. A plurality of cross members 76, 77, 78, 79, 80, and 81 are mounted for securing the bottom portion of the sidewalls together, these cross members 76 to 81 resting on the asphalt base 10.

Secured at the intake end of the machine is a pair of bearing members 83 and 84, in which are supported the ends of a roughened roller or drum 85 and at the delivery end of the machine are mounted similar brackets 86 and 87 in which are rotatably mounted the ends of a roughened roller or drum 88, the shaft 89 of roller or drum 88 having a suitable driving means thereon such as a sprocket wheel 90 on which is mounted suitable driving means such as sprocket chain 91 deriving power from any suitable source for turning the roller or drum 88. On rollers or drums 85 and 88 is mounted an endless belt 93 preferably made of coarse-mesh, woven wire for moving the leaf tobacco thru the machine.

The tension of endless belt 93 is regulated by adjustable bearings shown in the brackets in which the rollers are mounted. A plurality of rollers 95 are transversely disposed throughout the machine and are rotatably mounted in the sidewalls of the machine for supporting the upper portion of the endless belt and similar rollers 96 are provided, likewise, for supporting the lower portion of the belt. Breaker rolls 97 and 98 are mounted in suitable adjustable bearing brackets 99 at their ends for adjusting the position of the endless belt 93.

The machine is divided into five compartments, designated by A, B, C, D, and E, and the lower halves of these compartments are separated from each other by suitable walls formed of boards 100 and 101 secured to transverse members 102, 76, 77, 78, 79, and 80. These walls formed of members 100 and 101 have a transversely disposed slot therein thru which endless belt 93 passes. Inspection door 104 is provided for compartment A and inspection door 105 is provided for compartment B. Likewise, inspection door 106 is provided for compartment C and inspection door 107 is provided for compartment D. Immediately above the upper edge of the partitions formed by members 100 and 101, there is an opening 108 between the compartments and this opening is closed by a flexible member such as a thick piece of canvas 107 secured to cross member 110 and having its lower edge in close proximity to endless belt 93, which allows the tobacco to be carried along by the belt and at the same time cuts off communication between the chambers as nearly as is possible.

Figure 9:
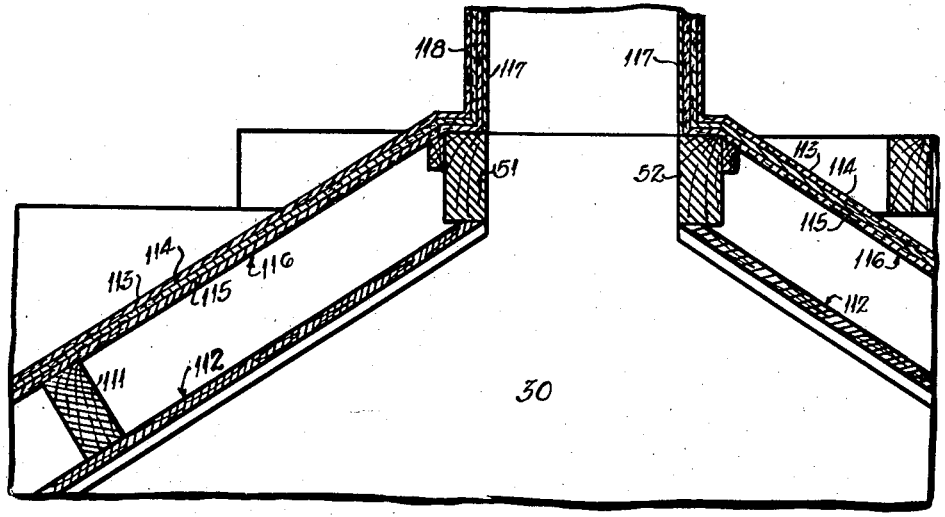
Figure 9 is an enlarged detailed view of the top portion of a pair of sloping covers for one of the compartments showing a portion of the ducts which leads to one of the fans.

In addition to the members in each group including a member 110 there are intermediate members 111 and to the lower surface of members 110 and 111 as well as a cross member secured on top of the framework and each of which is indicated by a different reference character, heretofore enumerated, is secured a board 112 and on the upper edges of these transversely disposed members are secured insulating means such as a plurality of layers of insulating board, the layers being indicated by reference characters 113, 114, and 115 in Figure 9. The insulating members as a whole are referred to by 116 in the other portions of the drawings.

The description of compartment A, as to the roof structure, likewise, applies to the other compartments and similar reference characters apply.

Between members 51 and 52 and communicating with the upper portion of compartment A is secured a draft duct 117 which is insulated as at 118 in Figure 9 in the same manner as the top of the sloping roof of each compartment and indicated broadly as at 116. These ducts 117, at their other end, communicate with a centrifugal fan casing 119 mounted on cross members 53 and 54 and driven by a suitable pulley 120. A suitable centrifugal fan is mounted in fan casing shown and in some portions thereof the casings are shown in sections revealing a fan 121, said fan being identical in all of the fan casings.

From the other side of the fan casings, Figure 3, a duct 122 extends to the top of mixing or vapor chamber 123 formed on the side of the machine and having sidewalls 124 and 125.

An inspection door 126 is mounted in sidewall 124 and communicates with the lower portion of compartment A, thru opening 127. (See Fig. 6.)

A longitudinally disposed perforated pipe 128 is mounted in mixing chamber 123 and has connected thereto a steam supply pipe 129 extending to the exterior of the chamber 123 and having a valve 130 therein controlling the amount of steam supplied to the chamber 123. A pipe 131 is connected to a suitable source of steam supply.

In this first compartment A, I prefer to use a saturated steam having a high temperature and relatively high pressure. I have found that in compartment A, the use of a saturated steam at approximately 100 pounds pressure at a temperature of 338 degrees Fahrenheit gives good results, which causes the tobacco to be heated and saturated to make it open up so it will become saturated quickly. The above pressure and temperature may be varied greatly but best results are obtained by using approximately the temperature and pressure as above recited.

It is thus seen that in compartment A, steam is introduced into the vapor chamber and this is mixed with air impelled thru duct 122 and the air and steam mix in vapor chamber 123 and pass thru openings 127 into compartment A beneath the endless belt 93 and is drawn upwardly thru the tobacco, striking the sloping surfaces 112, and then up thru the fan. It is seen that any condensation which may take place will necessarily be in the vapor chamber or in the lower part of the machine, in which event, no damage will be done to the tobacco. The saturated vapor passing thru the tobacco and causing the tobacco to become heated, opened and saturated then strikes against the members 112, preferably made of wood and insulated by members 116; therefore, no condensation occurs by the striking of the vapors against the sloping portions 112 and this saturated vapor, bearing with it impurities extracted from the tobacco, is carried into the fan casing 119 and there condensation occurs because the fan casing is not insulated. A pipe 132 communicates with the lowermost portion of fan casing 119 and is led to a sump 133 having a valve 134 in the lower end thereof from whence the impurities can be removed at will.

Vapor chamber 135 is disposed alongside vapor chamber 123 and comprises outer sidewall portion 136 and 137 and is insulated and separated from chamber 123 by means of the end walls 138 for chamber 123 and 139 of chamber 135. Chamber 135 also has its end wall 140 which is integral with division wall 100. The outside walls of vapor chambers 123 and 136 are supported by a framework comprising vertically disposed supports 141 mounted on strips 141a and longitudinally disposed members 142 and angular members 143, the angular members having spaced therefrom insulating top portions 144 similar to the insulation sheets 116 heretofore described.

Vapor chamber 135 has an inspection door 145. Disposed within vapor chamber 135 is a longitudinally extending perforated pipe 146 which is connected to a pipe 147 extending to the exterior of the machine having a valve 148 therein which has connected to the other side thereof a pipe 149 which supplies steam to chamber B. The steam in pipe 149 is saturated steam which has a lower pressure and a lower degree of heat than superheated steam. I have found that best results are obtained by using a steam in compartments B, C, and D at a pressure of 8 pounds and having a temperature of 238 degrees Fahrenheit. It is evident that pressure and temperature can be varied to suit various conditions.

Openings 150 are provided in the lower sidewall 137 thru which saturated atmosphere can pass from vapor chamber 135 into lower portion of compartment B. The upper portion of compartment B has the sloping roof structure identical to the roof structure as previously described for compartment A, and connected thereto is one end of an insulated duct 151 which has its other end connected to fan housing 152, identical to fan housing 119 having a similar centrifugal fan therein driven by pulley 120, as previously described. From one side of fan housing 152 a duct 153 is led into the upper portion of vapor or mixing chamber 135 so that it is seen that a circulation is maintained thru compartment B which moves upwardly in compartment B and downwardly in vapor chamber 135 at all times in the same manner as in compartment A, which has previously been described. Fan housing 152 has a pipe 154 connected to the lowermost portion which connects to pipe 132 heretofore described thru which condensed vapor bearing impurities, is directed into the sump 133.

Compartments C and D are identical in all respects to compartment B and have adjacent thereto a pair of vapor chambers having a sidewall structure formed of vertical members 155 mounted on strips 155a and longitudinal members 156 are disposed between said members 155 and angularly disposed members 157 support a roof structure 158.

Figure 7:
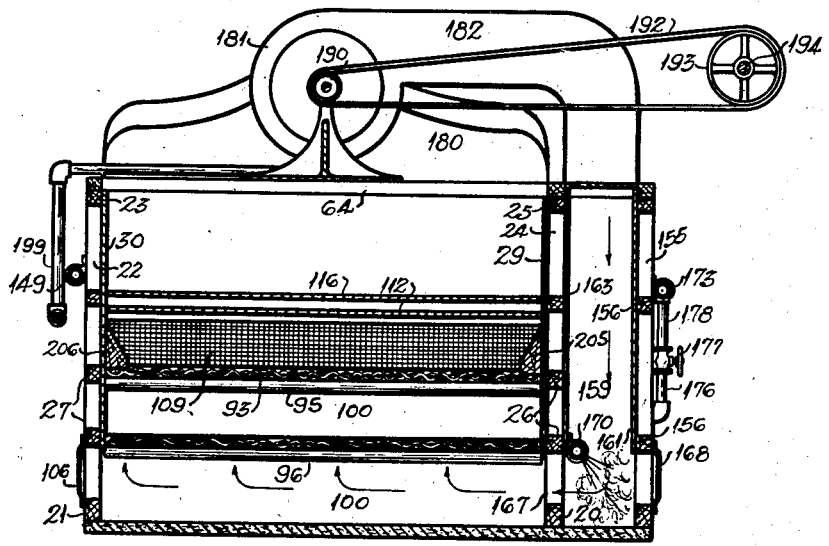
Figure 7 is a transverse vertical sectional view taken along the line 7—7 in Figure 3A.
Figure 8:
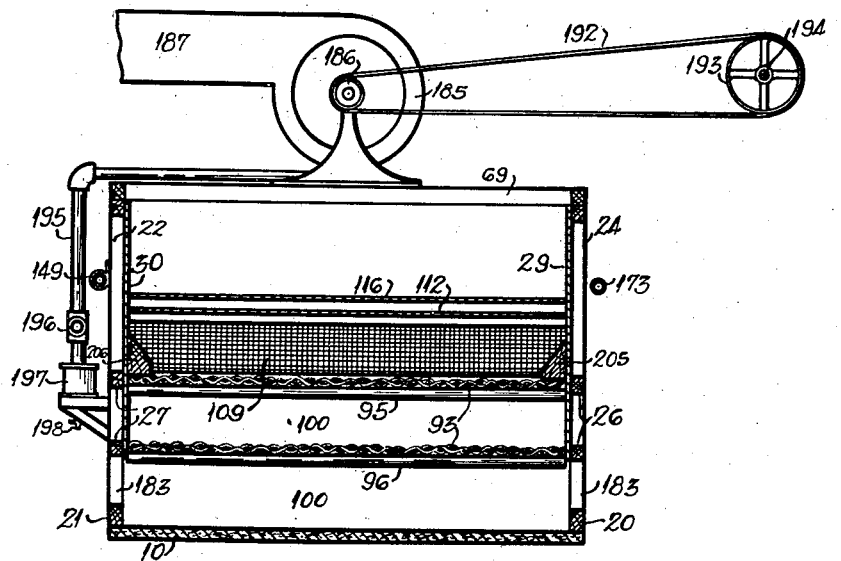
Figure 8 is a transverse vertical sectional view taken along the line 8—8 in Figure 3A.

This provides two vapor chambers 159 and 160 (see Figs. 5 and 5A) having outer sidewalls 161 and 162 respectively, the inner sidewalls being shown at 163 in Figure 7. To the uppermost portion of compartment C is connected an insulated duct 164 which has its other end connected to fan housing 165, and from one side of fan housing 165 a duct 166 extends into the top of vapor chamber 159. Fan casing 165 has connected to the lower portion thereof a pipe 195 connected to a drain pipe 196 which empties into a sump 197 having a valve 198 in the lower portion thereof from which the condensation can be removed at will.

In the bottom of vapor chamber 159 are a plurality of openings 167 which allow saturated atmosphere to pass from chamber 159 into the lower portion of compartment C. Vapor chamber 159 has mounted therein perforated pipe 170 having connected thereto pipe 171, which leads to the exterior of the vapor chamber 159. Pipe 171 has valve 172 therein which has connected to the other side thereof pipe 173 which is connected to main steam supply pipe 174. Vapor chamber 160 likewise has perforated pipe 175 therein having pipe 176 leading to the exterior of the machine. Pipe 176 has valve 177 therein with pipe 178 also being connected to pipe 173 for supplying steam to compartment D.

Suitable inspection doors 168 and 169 are provided for vapor chambers 159 and 160 respectively. Vapor chamber 160 has openings 179 in the lower portion thereof communicating with the lower portion of compartment D. The upper portion of compartment D has a roof structure similar to the previously described compartments and has connected to the central portion thereof insulated duct 180. To the other end is connected fan casing 181 having a suitable centrifugal fan therein, and one side of the fan casing 181 has an exhaust duct 182 leading into the top vapor chamber 160. Fan casing 181 has communicating with the lowermost portion thereof a pipe 199 which is also connected to drain pipe 196.

Compartment E is a cooling compartment and, therefore, has no vapor chamber associated therewith. The lower portion of each of the sidewalls of the machine has openings 183 therein thru which atmosphere is allowed to enter beneath the endless belt. The upper portion of this compartment is identical to the previous compartment, that is, having sloping insulated roof portions, the upper portion of which is connected to insulated duct 184, whose other end is connected to fan casing 185 having a suitable fan therein driven by pulley 186 and the other side of fan casing 185 exhausts into the atmosphere as shown at 187. Fan casing 185 has secured to the lowermost portion thereof a drain pipe 201 which, likewise, is connected to drain pipe 196.

Each vapor compartment or mixing chamber has a thermometer associated therewith and the gauge of each thermometer is located on the exterior of the machine so the operator can observe the temperature within the vapor compartments. These thermometers are indicated by reference characters 202, 203, 204, and 205, there being a thermometer for each vapor or steam compartment. The fans 121 in casings 165 and 181 are mounted on a shaft 189 having thereon pulley 190. The fans in all of the fan casings described having the pulleys thereon as previously described are driven by suitable means such as belts 192 mounted on pulleys 193 on a drive shaft 194 disposed along or above the machine.

It is thus seen that as the leaf tobacco is fed into the machine, it can be placed therein in large quantities, because the temperature in compartment A being high and the steam pressure being high, it causes the tobacco to be heated while it is traveling thru compartment A to break apart so as to be more susceptible to the vaporized atmosphere to which it is subjected in the succeeding compartments. It is seen that on account of the peculiar roof structure which is insulated, as well as the sidewalls being made of insulating material such as wood, and on account of the draft from bottom to top in each compartment and on account of condensation of the humidified air taking place in the fan casings that a more efficient machine is provided because this machine prevents drops of condensation from forming above the tobacco and dropping therein and thus damaging the tobacco.

Disposed on each side of the endless belt 93 and immediately above the upper portion thereof are the strips 205 and 206 (see Figs. 4 and 7) which project inwardly over the belt to prevent the leaf tobacco from falling off the side of the belt as it is transferred to the machine.

In the drawings and specification, there has been set forth a preferred embodiment of the invention, and although specific terms are employed, they are used in a generic and descriptive sense only and not for purposes of limitation, the scope of the invention being set forth in the appended claims.

I claim:

1. Tobacco treating apparatus comprising a plurality of compartments disposed end to end and having relatively small openings establishing communication between each other, an endless belt for conveying leaf tobacco through said compartments, a mixing chamber for each compartment, means connecting the upper ends of said compartments and the upper end of said mixing chambers together, means connecting the lower end of each compartment with the lower end of its associated mixing chamber, means for releasing saturated steam into the mixing chamber, draft producing means in said upper connections, and means in said upper connections for condensing moisture from the mixture of atmosphere and steam after it has passed upwardly through the tobacco in all of the compartments.

2. In a tobacco treating machine, an enclosed elongated box-like structure having a plurality of separated compartments therein, each of said compartments having an opening in its endwalls communicating with adjacent compartments, an endless belt member disposed within said compartments, flexible closure means normally closing communication between said compartments, a vapor chamber disposed adjacent each compartment and having an opening in the lower portion thereof communicating with a compartment, converging roof members for each compartment, a duct connected to the top of each compartment and also having its other end connected to the top of a vapor chamber, a fan in each duct for withdrawing atmosphere from each compartment and introducing saturated steam into the vapor chamber, insulating means for all of said chambers, ducts and compartments, excepting said fan casings, thereby causing condensation of the vapors in the fan casings, and means for withdrawing the condensate from the fan casings.

3. A tobacco treating machine having a plurality of alined compartments and each compartment having an opening in opposed end walls communicating with adjacent compartments, means for normally closing communication between the compartments, an endless belt passing thru all of said compartments and thru said openings for conveying leaf tobacco thru said compartments, a circulatory system for each compartment comprising a vapor chamber located adjacent each compartment and having communication with the lower portion of its associated compartment, a sloping roof for each compartment, a duct leading from the top of each roof structure to the top of said vapor chamber, draft producing and cooling means disposed in each duct, means for introducing steam into each vapor chamber, said chambers, ducts and compartments being insulated to cause the impurities in the atmosphere to be condensed in the draft producing means, and means for allowing the condensate to flow from the draft producing means.

4. A tobacco treating machine having a plurality of alined compartments having relatively small openings establishing communication between the compartments, means for conveying leaf tobacco successively thru said openings and all of said compartments, means for introducing saturated heated atmosphere into the lower portion of each compartment, means for withdrawing the atmosphere from the top of each compartment, and means for condensing the moisture in the atmosphere outside the compartments and returning the atmosphere to the lower portion of the compartment from which it was drawn.

5. A tobacco treating machine having a plurality of alined compartments communicating with each other at adjacent end portions, a continuous belt disposed in all of said compartments for conveying leaf tobacco therethrough, each of said compartments having a vapor chamber associated therewith and communicating with the lower portion of each compartment, means for introducing saturated steam and atmosphere into each of said vapor chambers, suction means for drawing the saturated and heated atmosphere from said vapor chambers into the lower portion of each compartment and out of the top of each compartment and back into the top of the vapor chamber, and means on the outside of the compartments for condensing impurities in the atmosphere drawn through the machine.

6. A machine for treating leaf tobacco having a plurality of alined, inter-communicating and adjacent compartments, a vapor chamber associated with each compartment, means for introducing saturated steam into each vapor chamber, means for drawing saturated atmosphere from said vapor chamber into the lower portion of each compartment and upwardly thru each compartment and out of the top of each compartment and into the top of each vapor chamber, means for conveying the leaf tobacco successively thru the compartments, and means for condensing the moisture in the atmosphere drawn thru the compartments before it is again introduced into the vapor chamber for the compartment from whence it has been taken.

7. A machine for treating leaf tobacco and having a plurality of alined compartments communicating with each other, a mixing chamber associating with each compartment, means for introducing steam into each of said chambers, means for withdrawing atmosphere from the top of a compartment and introducing it into the top of a chamber, means for conveying the atmosphere from the bottom of a mixing chamber into the bottom of a compartment, and means located without said chambers and said compartments, for condensing moisture existing in the atmosphere when it is withdrawn from the top of the compartment.

8. In a machine for treating leaf tobacco, comprising an elongated housing having a plurality of communicating compartments therein, each compartment having associated therewith a mixing chamber, a fluid connection between the lower portions of each compartment and its associated mixing chamber, means for introducing saturated steam into each of said mixing chambers, combined suction and pressure means for each compartment having its suction side connected to the top of a compartment and having its pressure side connected to the top of a mixing chamber, means for conveying leaf tobacco thru said compartments, said chambers and compartments being insulated against outside atmosphere to thereby condense impurities in the suction and pressure means.

9. In a machine for treating leaf tobacco and being provided with a plurality of separated compartments disposed end to end, means for conveying leaf tobacco successively thru said compartments, each compartment having a sloping insulated roof and having insulated sidewalls, a mixing chamber associated with each compartment and having communication with the lower portions of a compartment, means for introducing saturated steam into the mixing chambers, means for withdrawing atmosphere from the top of the compartments, comprising an insulated duct having its ends communicating with one of said compartments and one of said mixing chambers and a fan in said duct having its casing exposed to atmospheric conditions to thereby condense moisture in the atmosphere drawn from the compartment to prevent the return of the moisture into the mixing chamber.

10. In a machine for treating leaf tobacco, a compartment, means for conveying leaf tobacco thru the compartment, a mixing chamber for the compartment, said mixing chamber and said compartment communicating with each other at the bottom portions, a duct leading from the top of the compartment into the top of the mixing chamber, draft producing and draft cooling means disposed in said duct and having a casing for said draft producing means, to thereby cause condensate to be formed in the casing, and means for draining said condensate from said casing.

11. In a machine for treating leaf tobacco comprising a compartment, a mixing chamber, means for releasing steam into the mixing chamber, the bottom portion of the compartment having an opening communicating with the lower portion of the mixing chamber, the upper portion of the compartment having an extension in fluid communication with the upper portion of the mixing chamber, draft producing means in said extension and a condensing casing surrounding said draft producing means whereby moisture and impurities extracted from the tobacco and borne by said moisture may be extracted from the atmosphere being circulated thru the compartment and mixing chamber.

12. In a machine for treating leaf tobacco, an insulated compartment, a mixing chamber having an opening in the lower portion thereof communicating with the lower portion of the compartment, means for conveying leaf tobacco longitudinally thru the compartment, a duct connecting the upper portion of the compartment with the upper portion of the mixing chamber, means for releasing saturated steam into the mixing chamber, draft producing means in said duct adapted to withdraw air from the upper end of the compartment and force it into the upper end of the mixing chamber, cooling means associated with said draft producing means for cooling the air withdrawn from the compartment and thereby condensing the moisture therein to liberate impurities extracted from the tobacco and means for withdrawing the condensate from the cooling means.

13. In a machine for treating leaf tobacco, a compartment having its sidewalls insulated, an angularly disposed roof covering said compartment, means for insulating said roof, an insulated mixing chamber disposed adjacent to one side of said compartment and having an opening in the lower portion thereof communicating with the lower portion of the compartment, an insulated duct having one end thereof communicating with the upper portion of said compartment, a fan casing communicating with the other end of said duct, the outside of said fan casing being exposed to the atmosphere, a duct leading from said fan casing to the upper end of said mixing chamber, said fan casing being adapted to condense therein moisture from the atmosphere drawn upwardly thru said compartment.

14. That method of treating leaf tobacco which comprises subjecting an enclosed moving mass of leaf tobacco in a compartment to an upwardly moving draft of air having mixed therewith saturated steam, preventing condensation of moisture on the upper walls of the compartment withdrawing the air from the top of the enclosed mass of tobacco and cooling the air to condense the moisture therein, then again mixing the air with saturated steam and again subjecting the leaf tobacco to the air mixed with saturated steam, then moving the mass of tobacco to another compartment and repeating the above described operations.

15. That process of treating leaf tobacco to remove therefrom harmful ingredients which comprises moving the tobacco through a compartment while subjecting the tobacco to air mixed with saturated steam, then cooling the air to condense the moisture therein, reclaiming said moisture to prevent its contacting the tobacco, then again subjecting the cooled air to saturated steam to supply thereto the desired moisture content and again subjecting the tobacco to the moistened air, then passing the tobacco through another compartment and while the tobacco is moving, repeating the above described operations.

16. That method of treating leaf tobacco which comprises subjecting the tobacco to air mixed with steam heated to a point above 300 degrees Fahrenheit and having a pressure of above 75 pounds, then subjecting the tobacco to a draft of air mixed with a steam having a temperature of less than 250 degrees Fahrenheit and a pressure of less than 20 pounds per square inch.

17. That method of treating leaf tobacco which comprises subjecting the tobacco while moving through a compartment to an upwardly moving draft of air impregnated with saturated steam, then extracting at least a portion of the moisture from the air, then again impregnating the air with saturated steam and again introducing said impregnated air to said tobacco, then moving the tobacco through another compartment and repeating the above described operations.

18. That method of treating leaf tobacco which comprises providing a circulatory draft of air in a plurality of closed compartments, impregnating the air in each compartment with saturated steam to heat the same and to impart thereto a high moisture content, then passing the tobacco successively through said compartments to subject it to said impregnated drafts, then condensing and reclaiming the moisture from the air drawn from each compartment and again impregnating the said air with saturated steam and again subjecting the tobacco to said impregnated draft of air.

19. That method of treating leaf tobacco to remove impurities therefrom which comprises moving the tobacco through a plurality of compartments and passing a current of air treated with saturated steam thru the tobacco as it passes through each compartment, then withdrawing the air from each compartment and cooling the air to condense moisture therein, then again treating the air for each compartment with saturated steam and again treating the tobacco with the saturated air.

20. That method of treating leaf tobacco which comprises moving the tobacco through an enclosure and subjecting the tobacco as it passes through the compartment to a mixture of air and saturated steam, withdrawing the mixture from the enclosure and cooling the same to extract therefrom the moisture content, then again mixing with the cooled air another charge of saturated steam and again subjecting the tobacco to the mixture of air and saturated steam, then moving the tobacco through another enclosure and repeating the above described operations.

21. Tobacco treating apparatus comprising an elongated casing having a plurality of compartments connected by means of alined openings, each of said compartments having a sloping insulated roof for preventing condensation of moisture thereon, means for conveying tobacco successively through said compartments, means for passing moistened heated air upwardly through said compartments and outside the casing, means for condensing the moisture in the air at a point outside the casing, steam heated chambers disposed outside the compartments and having openings communicating with the lower portions of the compartments.

22. Means for treating tobacco comprising a compartment having a sloping insulated roof, means for supplying moistened heated air to the lower portion of the compartment, means for withdrawing the moistened heated air from the top of the compartment, means for condensing the moisture in the air at a point outside the compartment, and means for again charging the same air with moisture and introducing it into the lower portion of the compartment.

23. Apparatus for treating leaf tobacco comprising a closed compartment having sidewalls, a bottom and a heat-insulated roof, means for forcing heated saturated air through said compartment and withdrawing the air from the compartment, means for subjecting the air while outside the compartment to a cooling operation to remove moisture therefrom, means for again heating and saturating the air before it again enters the compartment.

24. Apparatus for treating leaf tobacco comprising a closed compartment having a heat-insulated roof, means for saturating and heating air and forcing the same through said compartment, means for de-humidifying the air after it has been passed through the compartment and before it again enters the compartment.

FRANK P. SMITH.